(12) United States Patent
McQueen

(10) Patent No.: US 9,704,007 B2
(45) Date of Patent: Jul. 11, 2017

(54) ILLUMINATION WITH WEDGE-SHAPED OPTICAL ELEMENT

(71) Applicant: Datalogic ADC, Inc., Eugene, OR (US)

(72) Inventor: Alexander M. McQueen, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/856,232

(22) Filed: Sep. 16, 2015

(65) Prior Publication Data

US 2017/0076124 A1    Mar. 16, 2017

(51) Int. Cl.
  *G06K 7/10*    (2006.01)
  *F21V 8/00*    (2006.01)

(52) U.S. Cl.
  CPC ....... *G06K 7/10732* (2013.01); *G02B 6/0058* (2013.01)

(58) Field of Classification Search
  CPC .......... G06K 7/10722; G06K 7/10732; G06K 7/10811; G06K 13/08; G06K 19/04; G06K 2017/0038; G06K 2207/1011; G06K 7/10594; G06K 7/10613; G06K 7/10633; G06K 7/10673; G06K 7/10693; G06K 7/10702; G02B 5/28; G02B 5/32; G02B 2027/0112; G02B 2027/0118; G02B 2027/0123; G02B 2027/013; G02B 2027/014; G02B 2027/0147; G02B 2027/0178; G02B 2027/0187; G02B 26/123; G02B 27/0093; G02B 27/017
  USPC ........................................ 235/462.01–462.45
  See application file for complete search history.

(56) References Cited

U.S. PATENT DOCUMENTS

| | | | | |
|---|---|---|---|---|
| 6,270,013 B1* | 8/2001 | Lipman | .............. | G06K 7/10881 235/454 |
| 7,173,235 B2* | 2/2007 | Ito | ...................... | G06K 7/10732 235/454 |
| 8,183,519 B2* | 5/2012 | Lin | ...................... | G02B 6/0023 136/246 |
| 2002/0196534 A1* | 12/2002 | Lizotte | ............... | B23K 26/0608 359/362 |
| 2003/0080190 A1* | 5/2003 | Tsikos | .................... | G02B 26/10 235/462.01 |
| 2008/0265030 A1* | 10/2008 | Tomita | ................ | G06F 17/2288 235/435 |

(Continued)

OTHER PUBLICATIONS

Adrian R. L. Travis, Timothy A. Large, Neil Emerton and Steven N. Bathiche, "Wedge Optics in Flat Panel Displays," IEEE, Jan. 18, 2012. 15 pages.

(Continued)

*Primary Examiner* — Thien M Le
(74) *Attorney, Agent, or Firm* — Seed IP Law Group LLP

(57) ABSTRACT

A machine-readable symbol reader can include a housing, a window, an illumination source, a wedge-shaped optical element, and a sensor array. Illumination can be coupled into the optical element through a base surface of the optical element and out of the optical element through a leg surface of the optical element. Illumination beams coupled out of the optical element through the leg surface can be parallel or substantially parallel to one another, and can exit the machine-readable symbol reader at a grazing angle to illuminate a machine-readable symbol at a grazing angle.

13 Claims, 6 Drawing Sheets

(56) References Cited

U.S. PATENT DOCUMENTS

2009/0008455 A1* 1/2009 Mayer ................ G06K 7/10613
   235/462.38
2010/0213258 A1* 8/2010 Liu .................... G06K 7/10732
   235/462.41

OTHER PUBLICATIONS

Adrian R. L. Travis, Timothy A. Large, Neil Emerton, Zhaoming Zhu and Steven N. Bathiche, "Image Capture via a Wedge Light-Guide With no Margins," Apr. 7, 2010, vol. 18, No. 8 / Optics Express 8453, 6 pages.

* cited by examiner

ILLUMINATION WITH WEDGE-SHAPED OPTICAL ELEMENT

BACKGROUND

Technical Field

The present disclosure relates to readers to read machine-readable symbols.

Description of the Related Art

Machine-readable symbols encode information in a form that can be optically read via an appropriately configured machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed of patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, may include more than two colors (e.g., more than black and white), may comprise directly marked materials having the symbols formed in surface relief, and/or may comprise electronic media displayed by an illuminated screen or display of an electronic device such as a cell phone.

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal by an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

In machine-readable symbol readers, a return light signal from the object or symbol being read is focused onto a sensor or sensor array. In the example of a machine-readable symbol reader reading marks and spaces of a typical machine-readable symbol, there needs to be sufficient difference in signal intensity between the signal corresponding to the light space and the signal corresponding to the dark bar in order for the processor to differentiate therebetween. Given the variety of types of machine-readable symbols in use and the variety of types of media or materials on which they can be used, it can be difficult to create a single set of lighting conditions (such as through illumination) suitable for general use. For example, machine-readable symbols formed in surface relief or displayed electronically are often difficult to read when illuminated by low incidence angle (direct) light.

Thus, machine-readable symbol readers using high incidence angle (grazing) illuminating light (illumination) can be used to improve reading of machine-readable symbols formed in surface relief or displayed electronically. Such techniques have disadvantages, however, including that it can be difficult to control the angle at which the high incidence angle illumination exits the reading device to illuminate the symbol, and that the illumination is often directly visible to the operator, causing fatigue, irritation, and possible eye strain.

BRIEF SUMMARY

In some embodiments, a machine-readable symbol reader comprises an optical element having a base, an end, a first major face, a second major face, a thickness, and a length between the base and the end, the second major face non-parallel to the first major face and opposed across the thickness of the optical element from the first major face, the thickness which varies along the length of the optical element, the first and the second major faces which propagate a diminishing amount of light passing through the optical element along the length thereof from the base toward the end by total internal reflection and which exit the light passing through the optical element from the base by refraction through at least one of the first or second major faces, an illumination source positioned to transmit illumination toward the base of the optical element, a housing that includes a window, the window positioned to pass illumination coupled out of the first major face of the optical element, and an optical sensor array.

In some cases, the machine-readable symbol reader is a barcode scanner. In some cases, an angle between the first major face and the second major face is between 0° and 10°. In some cases, the optical element, the illumination source, and the optical sensor array are positioned within the housing. In some cases, the optical sensor array is positioned to receive illumination entering the housing through the window. In some cases, the machine readable symbol reader includes a mirror positioned adjacent to the second major face of the optical element. In some cases, the machine readable symbol reader includes a second illumination source positioned to transmit illumination toward the window without being coupled into the base of the optical element. In some cases, the housing includes a second window, the second window positioned to receive illumination that travels from a machine-readable symbol toward the optical sensor array.

In some cases, the machine readable symbol reader includes a second optical element having a second base, a second end, a third major face, a fourth major face, a second thickness, and a second length between the second base and the second end, the fourth major face non-parallel to the third major face and opposed across the second thickness of the second optical element from the third major face, the second thickness which varies along the second length of the second optical element, the third and the fourth major faces which propagate a diminishing amount of light passing through the second optical element along the second length thereof from the second base toward the second end by total internal reflection and which exit the light passing through the second optical element from the second base by refraction through at least one of the third or fourth major faces, and a second illumination source positioned to transmit illumination toward the second base of the second optical element. In some cases, the optical element is rotationally offset from the second optical element by 180° about an axis perpendicular to the window.

In other embodiments, a method of imaging a machine-readable symbol comprises generating illumination, coupling a portion of the illumination into an optical element having a base surface and a decreasing thickness extending away from the base surface through the base surface of the optical element, coupling a portion of the illumination out of the optical element through a leg surface of the optical element, exiting a portion of the illumination out of a machine-readable symbol reader through a window of the machine-readable symbol reader toward the machine-readable symbol, receiving a portion of the illumination returned from the machine-readable symbol, and detecting at least a portion of the illumination returned from the machine-readable symbol by at least one sensor that is responsive to illumination.

In some cases, the method includes decoding the machine-readable symbol based on the portion of the illumination detected by the at least one sensor. In some cases, the method includes returning a portion of the illumination that is coupled out of the optical element through a second leg surface of the optical element back towards the optical element. In some cases, the returning includes reflecting off a mirror positioned adjacent to the second leg surface of the optical element. In some cases, the method includes coupling a portion of the illumination into a second base surface of a second optical element, and coupling a portion of the illumination out of the second optical element through a second leg surface of the second optical element.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

The technologies described herein can be used in machine-readable symbol readers, barcode scanners, optical imaging scanners, or for machine vision generally. These technologies can include wedge-shaped optical elements to provide grazing incidence illumination and improve mixed media reading and ergonomics of the readers or scanners.

Figure 1:
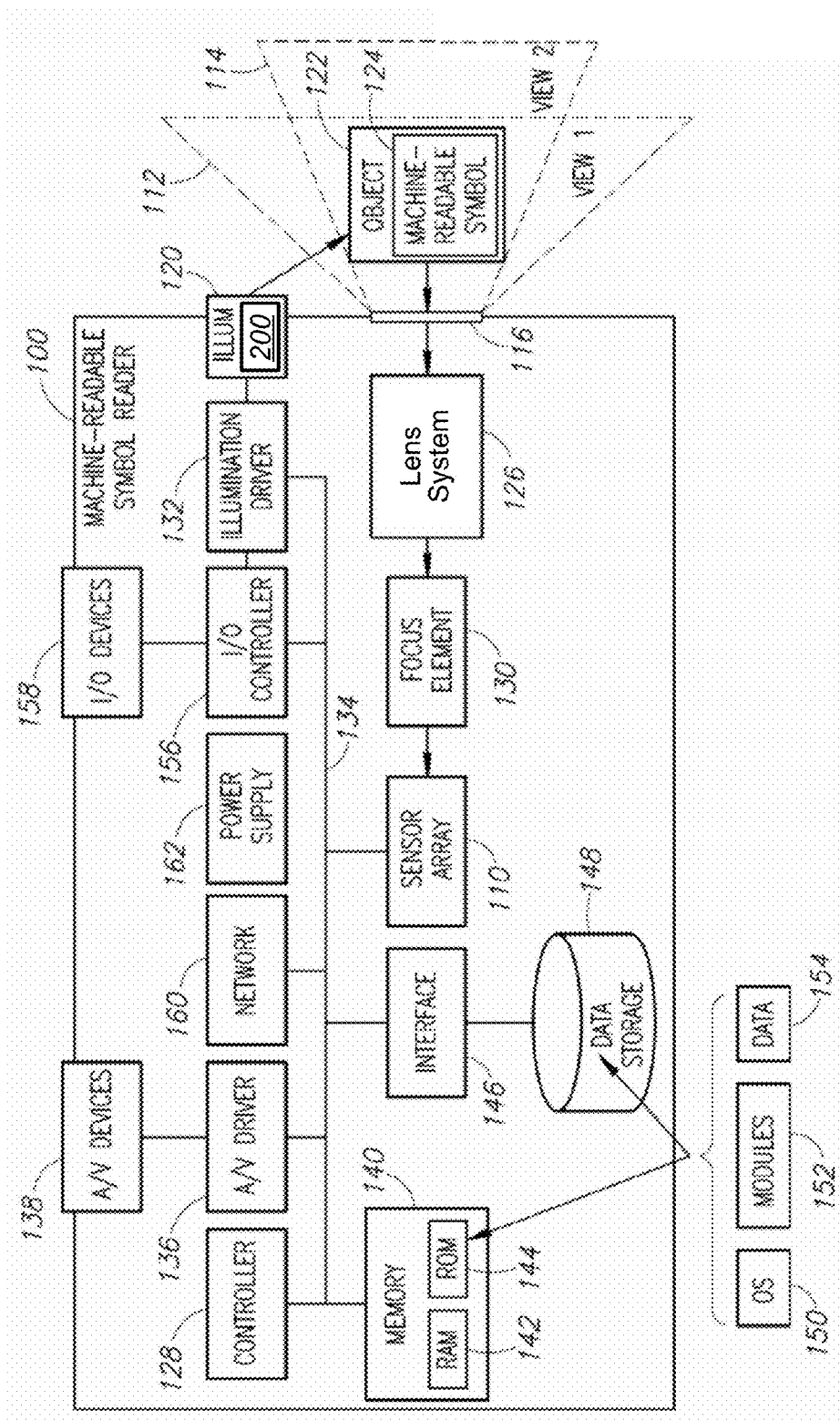
FIG. 1 is a block diagram of a machine-readable symbol reader and an object bearing a machine-readable symbol to be read, according to at least one illustrated embodiment.

FIG. 1 is a block diagram of a machine-readable symbol reader 100, according to one embodiment. The machine-readable symbol reader 100 includes an image sensor or sensor array 110, which can capture images of fields of view such as fields of view 112 or 114 through a window 116. The fields of view 112 and 114 can be focused onto the sensor array 110. Image frames captured by the sensor array 110 may include light emanating from one of the fields of view 112 or 114. FIG. 1 also illustrates an item or object 122 positioned within the fields of view 112 and 114. The object 122 includes a machine-readable symbol 124 (e.g., PDF417, Code 128, etc.) that is to be detected and/or decoded by the machine-readable symbol reader 100.

The machine-readable symbol reader 100 includes a lens system 126 positioned and oriented to focus light onto the sensor array 110. For example, the lens system 126 may comprise an array of optical elements with a common axis. The lens system 126 may also comprise a zoom lens coupled to a controller 128 to control an amount of optical zoom. In some embodiments, a 20×-40× amount of optical zoom is provided.

The machine-readable symbol reader 100 also includes a focal element 130 disposed between the lens system 126 and the sensor array 110 such that at least some of the light rays arrive at the sensor array 110 through the focal element 130. The focal element 130 operates to provide one or more image focus distances for light rays that strike the sensor array 110. For example, in some embodiments the focal element 130 is a thin plate of optical glass having a relatively high index of refraction $n_d$ (e.g., $n_d$ between 1.3 to 3.0) positioned over the sensor array 110.

The sensor array 110 forms an electronic image of the field of view 112 or 114. The sensor array 110 may comprise a wide range of image sensing devices for converting an optical image (or another wavelength in the electromagnetic spectrum) into an electrical signal. For example, the sensor array 110 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the sensor array 110 has been exposed to light emanating from fields of view 112, 114, data from all the pixels can be sequentially read out in a selectable pattern (which may be row-by-row, sub-region by sub-region, or some other pattern). The pixel intensity data may optionally be converted to digital form using an analog-to-digital converter.

In response to receiving an instruction from a controller 128, the sensor array 110 captures or acquires one or more images of the field of view 112 or 114. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read.

The machine-readable symbol reader 100 includes an illumination source 120, which is configured to illuminate the fields of view 112 and 114. The illumination source 120 can comprise any suitable source of light, such as one or more light emitting diodes (LEDs), flash strobes, incandescent or fluorescent lamps, or halogen bulbs. The illumination source 120 may generate light having one or more wavelengths. The illumination source 120 can also comprise an optical element 200 through which illumination generated by the source of light passes prior to passing out of the reader 100. The optical element 200 is described further below.

One or more illumination drivers or controllers 132 are provided. The illumination driver 132 is configured to apply signals to the illumination source 120 to, for example, strobe the illumination source 120 at desired times or to light the illumination source 120 constantly for a period of time. The illumination source 120 can be mounted within a housing of the machine-readable symbol reader 100 (e.g., behind window 116).

The sensor array 110 and the illumination driver 132 are communicatively coupled to the controller 128, which may be, for example, one or more of a processor, microprocessor, controller, microcontroller, digital signal processor (DSP), graphical processing unit (GPU) or the like (generally "processor"). Some implementations may include a dedicated machine-readable symbol scan engine or module as the controller 128. The communicative coupling may be via a bus 134 or other communication mechanism, such as direct connections of a serial, parallel, or other type. The controller 128 generally controls and coordinates the operation of other devices to which it is connected, such as one or more of the sensor array 110, the illumination driver 132, and an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to one implementation, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions to implement the methods for generating image data using the data reader 100. The data 154 may include one or more configuration settings or parameters, or may include image data from the sensor array 110 and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a keyboard, a pointing device, or other wired/wireless input devices, that allow the user to, for example, configure the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

The network interface 160 may optionally be provided to communicate with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. For example, the machine-readable symbol reader 100 may comprise a fixed scanner, such as an on-counter scanner or in-counter scanner, or a portable scanner, such as a handheld scanner. In addition, the machine-readable symbol reader 100 may include a radiofrequency identification (RFID) reader or interrogator and/or or a magnetic stripe reader. Such may be particularly useful when employed as a point-of-sale (POS) terminal.

After the sensor array 110 has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110. The controller 128 may condition the data received from the sensor array 110 and may generate an output that generally identifies which regions of the image correspond to highly reflective or light areas, and which correspond to less reflective or dark areas, for example.

Figure 2:
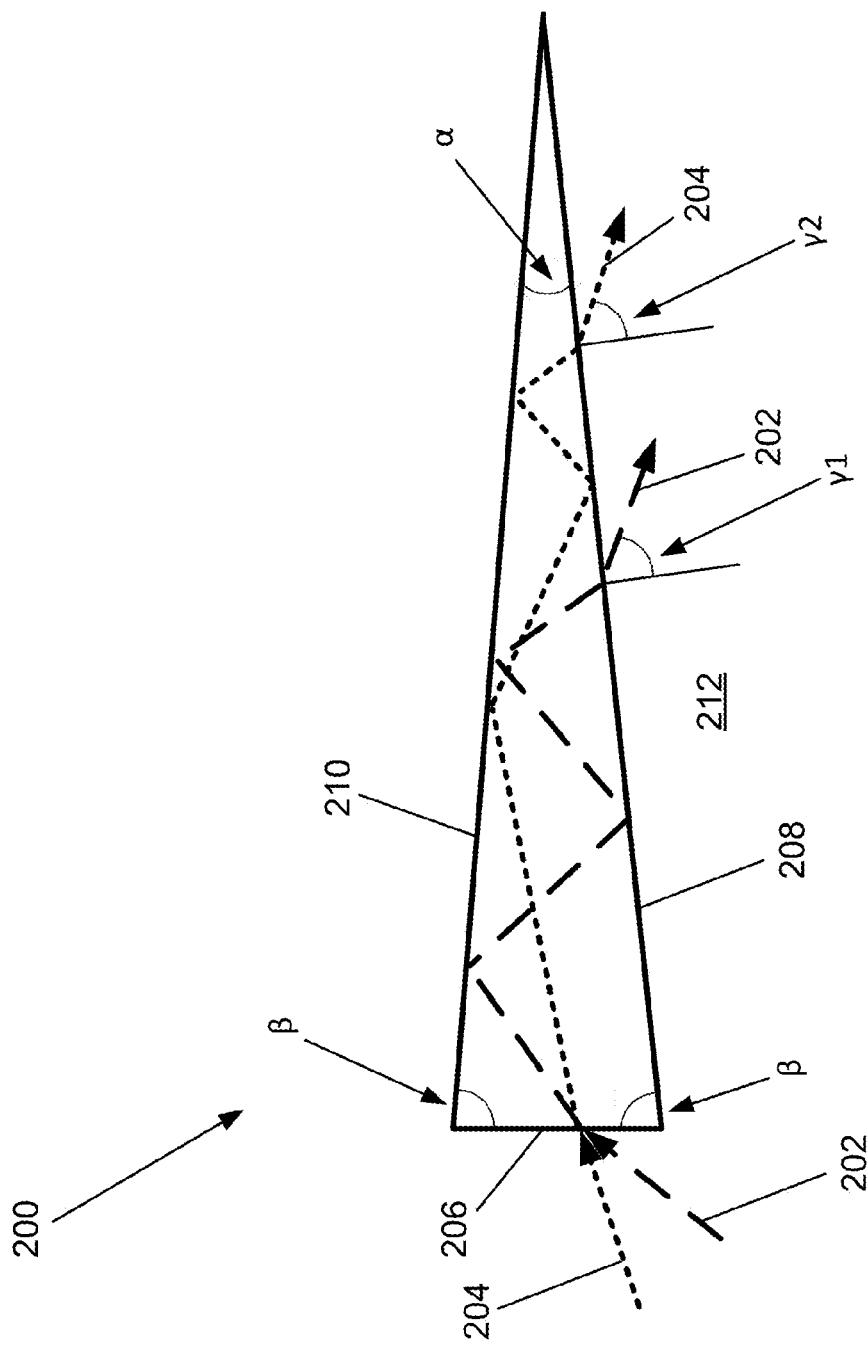
FIG. 2 is a diagram showing two illumination beams propagating through a wedge-shaped optical element to be used in a machine-readable symbol reader, according to at least one illustrated embodiment.

FIG. 2 is a diagram showing two illumination beams 202, 204, which can be rays of light or illumination, propagating through a wedge-shaped optical element 200 to be used in a machine-readable symbol reader, such as the reader 100 or any of the readers described elsewhere herein. In this context, the terms "illumination beam," "light," and "illumination" include visible, ultraviolet, and infrared light. The wedge-shaped optical element 200 can be a prism fabricated from any suitable material, such as various glasses, plastics, or fluorite. The optical element 200 can be optically transparent or transparent to the wavelengths of illuminating light to be used in a machine-readable symbol reader. The optical element 200 can have an index of refraction or refractive index that is greater than 1, and that is different from (e.g., less than or greater than) that of the surrounding environment 212, e.g., air. The optical element 200 can have flat, polished exterior surfaces 206, 208, 210, that can refract the illuminating light as it enters or exits the optical element 200, either with or without a cladding.

The optical element 200 can have a generally triangular cross-sectional shape, as shown in the diagram of FIG. 2, and the exterior surfaces 206, 208, and 210 can have generally rectangular shapes extending into or out of the page in the diagram of FIG. 2. Thus, the optical element can be a geometric triangular prism. The triangular cross-sectional shape of the optical element 200 can comprise any suitable triangle, such as an equilateral, isosceles, or scalene triangle. In the implementation illustrated in FIG. 2, the triangular cross-sectional shape of the optical element 200 comprises an isosceles triangle with a relatively short base at base surface or base face 206 and two relatively long, non-parallel legs at leg surfaces or leg faces (or major surfaces or major faces) 208 and 210.

The vertex angle α between the two leg surfaces 208 and 210 is relatively small compared to the base angles β between the base surface 206 and each of the leg surfaces 208 and 210. In some cases, the vertex angle α can be between 0° and 30°, between 1° and 30°, 0° and 20°, between 1° and 20°, between 0° and 10°, between 1° and 10°, between 0° and 5°, or between 1° and 5°. The optical element 200 can have a length that extends from the base surface 206 toward the end of the optical element 200 where the two leg surfaces 208, 210 meet at angle α. The optical element 200 can have a thickness perpendicular to its length or that extends from the first leg surface 208 toward the second leg surface 210. The thickness of the optical element 200 decreases along the length of the optical element from the base surface 206 toward the end.

Illuminating light to be used in a machine-readable symbol reader can enter, or be coupled into, the optical element 200 through the base surface 206, as shown by the illumination beams 202, 204. The illumination beams 202, 204 can approach the base surface 206 at any suitable angles of incidence, which in practice can include relatively low angles and relatively high angles of incidence. For example, the illumination beam 202 is shown approaching the base surface 206 at a relatively high angle of incidence compared to the illumination beam 204. Once coupled into the optical element 200, the illumination beams 202 and 204 can propagate through the optical element 200 until they encounter one of the leg surfaces 208 or 210.

The illumination beams 202 and 204 are both shown approaching the base surface 206 from the same side of the optical element's 200 axis of symmetry, if any, and after being coupled into the optical element 200, the illumination beams 202 and 204 are shown initially encountering the same leg surface 210. In some implementations, illuminating light can approach the base surface 206 from both sides of the optical element's 200 axis of symmetry, and after being coupled into the optical element 200, the illuminating light can initially encounter both of the leg surfaces 208 and 210.

Upon encountering one of the leg surfaces 208 or 210, the illumination beams 202 and 204 can either be refracted and coupled out of the optical element 200, or totally internally reflected back into the optical element 200, depending on the optical parameters (e.g., index of refraction) of the optical element 200 and the surrounding environment 212, and depending on the angle of incidence of the illumination beams 202, 204 to the leg surfaces 208, 210. If the illumination beams 202 and 204 are totally internally reflected at the leg surface 210, as shown in FIG. 2, they continue to propagate toward the other leg surface 208. Upon encountering the leg surface 208, the illumination beams 202 and 204 can, once again, either be refracted and coupled out of the optical element 200, or totally internally reflected back into the optical element 200.

Because the optical element 200 has a cross-sectional shape comprising an isosceles triangle (although other geometries, such as other triangles or a truncated isosceles triangle without a vertex angle, are suitable as well), every successive time the illumination beams 202 and 204 encounter one of the leg surfaces 208 or 210, they do so at a smaller angle of incidence, increasing the likelihood that the illumination beam 202 or 204 will be refracted and coupled out of the optical element 200, rather than totally internally reflected. Thus, all or substantially all of the illuminating light entering the optical element 200 at the base surface 206 will be coupled out of the optical element 200 through one of the leg surfaces 208 or 210. The illumination beams 202 and 204 are both shown being coupled out of the optical element 200 through the same leg surface 208. In some implementations, illuminating light can be coupled out of the optical element 200 through both leg surfaces 208, 210.

The angle of incidence with which an illumination beam approaches the base surface 206 can control the distance the illumination beam propagates through the optical element 200 before being coupled out of the optical element 200. For example, the illumination beam 202 is shown approaching the base surface 206 at a relatively high angle of incidence relative to the illumination beam 204. Thus, the illumination beam 202 reaches a critical angle to the leg surfaces 208, 210 before the illumination beam 204 does, and the illumination beam 202 is coupled out of the optical element 200 at a location closer to the base surface 206 than that for the illumination beam 204. Thus, if diffuse or relatively diffuse light, light having a broad range of angular emission, light having a wide range of starting angles, or light comprising a plurality of non-collinear rays of light, is coupled into the optical element 200 through the base surface 206, then the light can be coupled out of the optical element 200 relatively continuously and uniformly along a length of the optical element 200, although special cases can exist near the base surface 206 and near the vertex angle α. In this context, the term "uniform" means substantially uniform. Thus, the optical element 200 can be referred to as optically "leaky," and a diminishing amount of light can pass through the optical element along its length.

While two specific illumination beams 202 and 204 are illustrated interacting with the optical element 200 in FIG. 2, in some implementations a source of illuminating light can generate diffuse light that approaches the base surface 206 from a wide range of angles. As examples, the source can comprise any suitable source of light, such as one or more light emitting diodes (LEDs), flash strobes, incandescent or fluorescent lamps, or halogen bulbs. The illuminating light can be coupled into the optical element 200 and reflected back and forth between the two leg surfaces 208 and 210 until each individual ray of the illuminating light reaches a critical angle with respect to one of the leg surfaces 208, 210, and then is coupled out of the optical element 200. Thus, the optical element 200 can convert diffuse source light comprising a plurality of non-collinear rays of light into collimated, substantially collimated, or partially collimated illumination comprising a plurality of collinear or substantially collinear rays.

In particular, individual illumination beams, such as illumination beams 202 and 204, are coupled out of the optical element 200 once their angle of incidence with respect to one of the leg surfaces 208, 210, which decreases with each reflection within the optical element 200, decreases to or below the critical angle for that surface. Thus, the angles $\gamma_1$ and $\gamma_2$, at which the illumination beams 202 and 204 project away from the optical element 200, can be the same or substantially the same as one another, within 5% of one another, within 2% of one another, or within 1% of one another. A nominal angle $\gamma$ at or below which all illumination beams project away from the optical element 200 can be determined using Snell's law based on the optical properties of the system. All rays of illuminating light can project away from the optical element 200 at or below this nominal angle $\gamma$, and all rays of illuminating light can be within 25%, within 10%, within 5%, within 2%, or within 1% of this nominal angle $\gamma$. All rays of illuminating light can project away from the optical element 200 at uniform angles. In this context, the term "uniform" means substantially uniform or within at least 50%, within at least 25%, within at least 5%, or within at least 1%.

The optical element 200 can thus allow relatively precise control over, and relatively high uniformity of, the directions of the rays of the illuminating light as they project away from a machine-readable symbol reader. For example, the rays of the illuminating light can project away from the optical element 200 at relatively high angles (e.g., at least 60°, at least 75°, at least 80°, or at least 85°) of refraction, which can be grazing or glancing angles relative to one of the leg surfaces 208 or 210.

Figure 3:
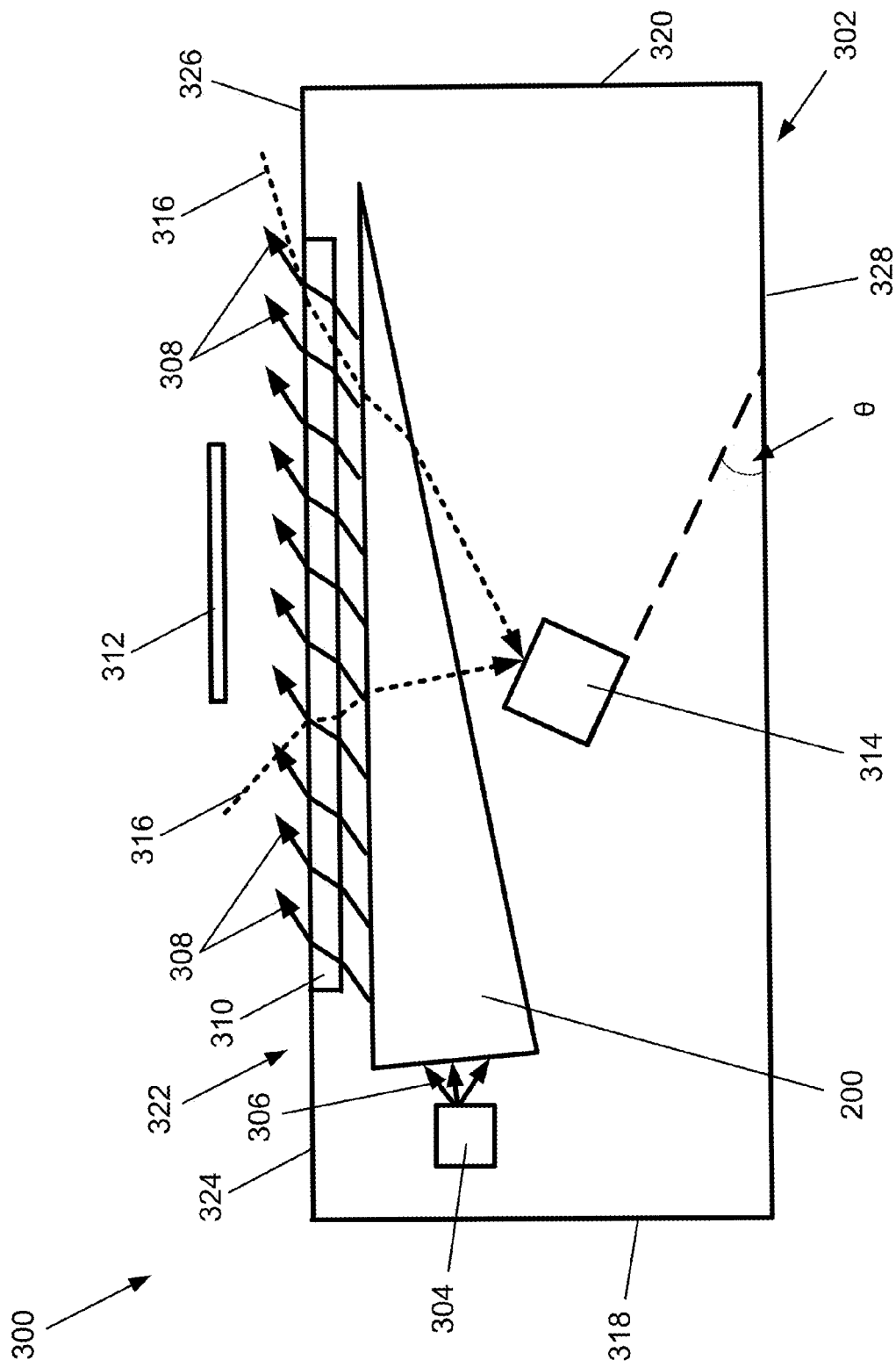
FIG. 3 is a diagram showing the wedge-shaped optical element of FIG. 2 incorporated into a machine-readable symbol reader, according to at least one illustrated embodiment.

FIG. 3 illustrates a machine-readable symbol reader 300 incorporating the optical element 200. Reader 300 includes an outer enclosure or housing 302 and an illumination source 304 that generates light or illumination beams 306. The illumination beams 306 can propagate through the optical element 200 and be coupled out of the optical element 200 through a leg surface thereof to form illuminating light comprising a plurality of parallel or substantially parallel illumination beams 308 that can be directed out of the housing 302 through a protective window 310. The illumination beams 308 can exit the housing 302 through the window 310 and travel toward an object 312 having a machine-readable symbol (similar to the machine-readable symbol 124) formed thereon. The illumination beams 308 can travel from the housing 302 toward the object 312 at a grazing angle with respect to the housing 302 and with respect to the object 312, which can make it unlikely or difficult for an operator of the reader 300 to see the illumination beams 308. The illumination beams 308 can also uniformly illuminate the object 312 and its machine-readable symbol.

In implementations in which the object 312 and its machine-readable symbol comprise relatively diffuse materials, the illumination beams 308 can illuminate the machine-readable symbol formed on the object 312 so that the machine-readable symbol can be more accurately imaged and more accurately identified by the reader 300. For example, the reader 300 can also include a photodetector or photosensor, an imager, camera, optical sensor, or sensor array 314 having a field of view 316 shown in dashed lines, which encompasses the object 312. The illumination beams 308 incident on the object 312 can be diffusively reflected or otherwise returned by the object 312 and the machine-readable symbol formed thereon. Some portion of the reflected or returned portions of the illumination beams 308 can enter the housing 302 through the window 310, pass through the optical element 200, and be received by the sensor array 314.

In implementations in which the object 312 and its machine-readable symbol comprise relatively reflective materials such as displays of electronic devices, the illumination beams 308 can be specularly reflected or otherwise returned by the object 312 and the machine-readable symbol formed thereon away from the window 310 and the sensor array 314. Thus, "hot-spots" and other undesirable interference caused by specular reflection or other return of the illuminating light back to a sensor array can be avoided. Light generated by the display of the electronic device itself can be sufficient to allow the machine-readable symbol to be properly imaged and identified. In implementations in which the machine-readable symbol comprises surface relief features formed in the object 312, the grazing angle of the illumination beams 308 can produce uniform shadows within the surface relief features, which can allow the machine-readable symbol to be more accurately imaged and identified.

In the implementation shown in FIG. 3, the housing 302 has a rectangular cross-sectional shape that includes a first end 318, a second end 320 opposite the first end 318, a first side 322 including the window 310 positioned between first and second peripheral walls 324, 326, and a second side 328 opposite the first side 322. The first and second ends 318, 320, the first and second peripheral walls 324, 326 of the first side 322, and the second side 328 of the housing 302 can be opaque to prevent light escaping from or entering the housing 302 other than through the window 310. Further, the optical element 200 is positioned in close proximity to the window 310, such that substantially all light exiting or entering the housing 302 passes through the optical element 200 in addition to the window 310.

Further still, the illumination source 304 is positioned in close proximity to the first end 318 of the housing 302, and thus behind the first peripheral wall 324. The illumination source 304 is positioned so that no illumination beam can exit directly out of the housing 302 through the window 310 without first passing through the optical element 200. This arrangement can prevent stray light from escaping, or can reduce the amount of stray light that escapes from the housing 302, thereby reducing irritation to an operator of the reader 300. Further, this arrangement can prevent or reduce the amount of stray light that enters into the housing 302 and interferes with the operation of the sensor array 314 and thus with the imaging and identification of the machine-readable symbol.

FIG. 3 illustrates that the sensor array 314 can be oriented at an oblique angle $\delta$ with respect to the rectangular cross-sectional shape of the housing 302. The angle $\delta$ can be selected or determined to maximize or optimize the amount of light received by the sensor array 314 from the object 312 and its machine-readable symbol, for example, to account for changes in the paths of the illumination beams reflected or otherwise returned by the object 312 and its machine-readable symbol as the illumination beams pass through the wedge shape of the optical element 200.

In the illustrated implementation, the optical element 200 is positioned between the window 310 and the sensor array 314, and between the object 312 and the sensor array 314. Thus, the illuminating light received by the sensor array 314 is reflected or otherwise returned by the object 312 and its machine-readable symbol, re-enters the housing 302 through the window 310, passes through the optical element 200, and then is received by the sensor array 314. In alternative implementations, however, the returning light does not pass through the optical element 200 in this way. For example, the sensor array 314 can be positioned such that the optical element 200 is not between the sensor array 314 and the window 310, or is not between the sensor array 314 and the object 312.

Figure 4:
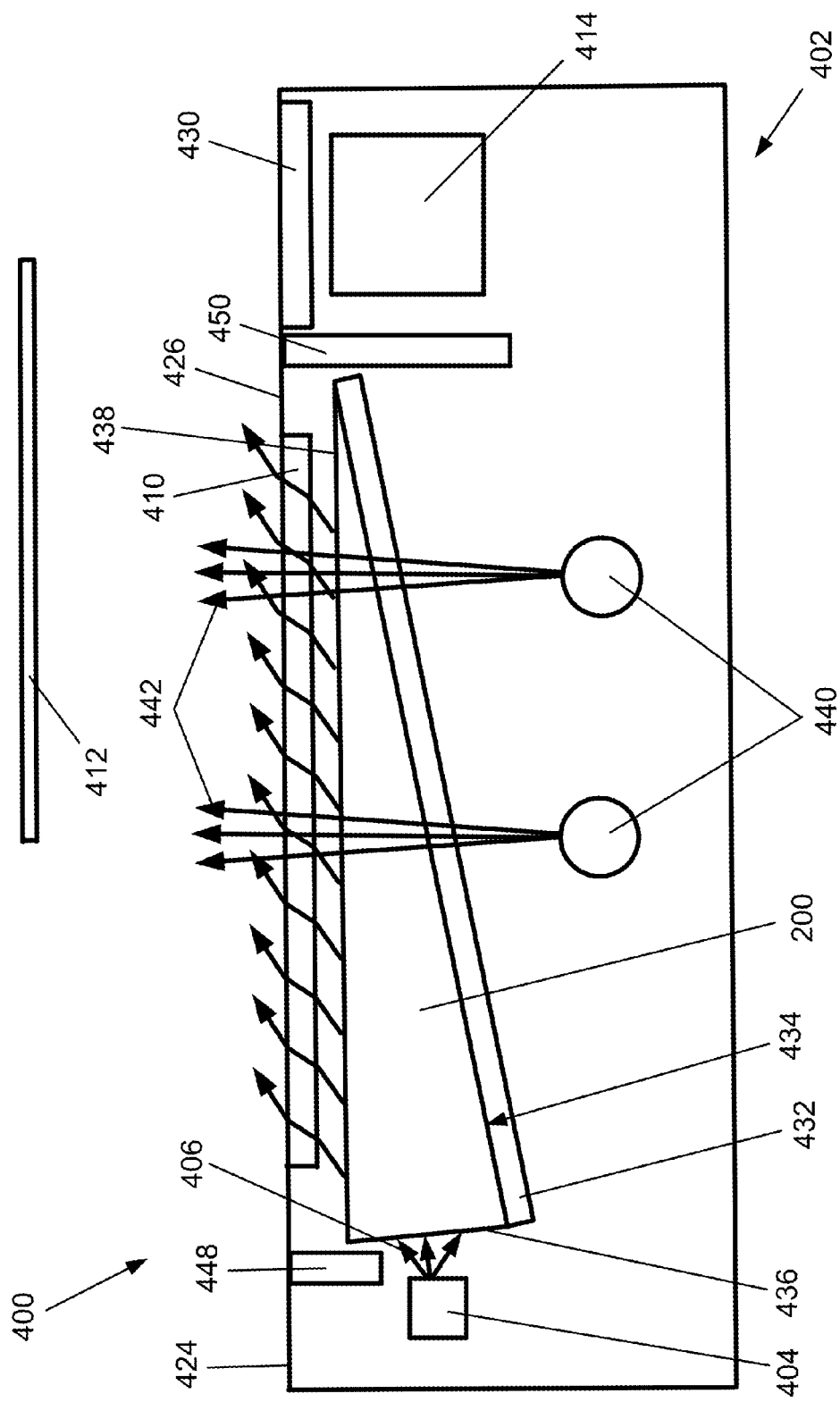
FIG. 4 is another diagram showing the wedge-shaped optical element of FIG. 2 incorporated into another machine-readable symbol reader, according to at least one illustrated embodiment.

As a specific example, FIG. 4 illustrates a machine-readable symbol reader 400 that is similar to the reader 300, and includes a housing 402 similar to the housing 302. A secondary window 430 can be formed in a first peripheral wall 424 or a second peripheral wall 426 of the housing 402, and a sensor array 414 can be positioned so that the secondary window 430 is positioned between the sensor array 414 and an object 412 having a machine-readable symbol formed thereon. As another specific example, the sensor array 414 can be shifted out of the plane shown in FIG. 4 (e.g., into or out of the page) such that an optical element 200 is no longer between the object 412 and the sensor array 414. In such an implementation, a primary window 410 or other secondary windows can be positioned between the sensor array 414 and the object 412.

In some implementations, such as that shown in FIG. 4, one of the leg surfaces of the optical element 200 can be positioned in contact with or adjacent to a reflective optical element 432 such as a mirror. For example, the leg surface 434 of the optical element 200 facing away from the window 410 can be positioned in contact with or adjacent to the reflective optical element 432. As described above, illumination beams can be coupled out of the optical element 200 continuously along both leg surfaces of the optical element 200. In the implementation shown in FIG. 4, however, any illumination beams coupled out of the optical element 200 through the leg surface 434 can be reflected or otherwise returned directly back into the optical element 200 through the leg surface 434, such that all or substantially all of the illumination beams coupled into the optical element 200 through the base surface 436 are coupled out of the leg surface 438 nearest to and facing the window 410. This can increase or double the amount of illuminating light available to illuminate the object 412 and its machine-readable symbol.

In some implementations, such as that shown in FIG. 4, the reader 400 can include one or more direct illumination sources 440, which can comprise any of the illumination sources described herein, and which can emit illumination that projects directly toward the object 412 without being coupled into the base surface 436 of the optical element 200. In such an implementation, the reflective optical element 432 can include a one-way mirror (e.g., half-silvered; dichroic), so that the illumination beams coupled into the base surface 436 of the optical element 200 can be reflected or otherwise returned by the reflective optical element 432 and illumination beams 442 generated by the direct illumination sources 440 can be transmitted through the reflective optical element 432.

The illumination beams 442 can travel through the reflective optical element 432, be coupled into the optical element 200 through the leg surface 434, be coupled out of the optical element 200 through the leg surface 438, and travel through the window 410 toward the object 412. The illumination beams 442 can increase the illumination of the object 412 and the machine-readable symbol formed thereon to improve imaging and identification of the symbol. In particular, the illumination beams 442 can provide relatively low incidence angle illumination, which can be combined with the grazing illumination described herein to more completely illuminate certain objects and machine-readable symbols for which low incidence angle illumination is beneficial.

The reader 400 can include one or more baffles 448, 450 positioned to prevent illumination from one region of the reader 400 undesirably interfering with elements in another region of the reader 400. For example, the reader 400 can include a first baffle 448 to prevent illumination 406 from an illumination source 404 exiting directly out of the housing 402 through the window 410, without travelling or propagating through the optical element 200. As another example, the reader 400 can include a second baffle 450 to prevent illumination from the direct illumination sources 440 passing directly toward the sensor array 414 without being reflected or otherwise returned from the object 412 and its machine-readable symbol.

Figure 5:
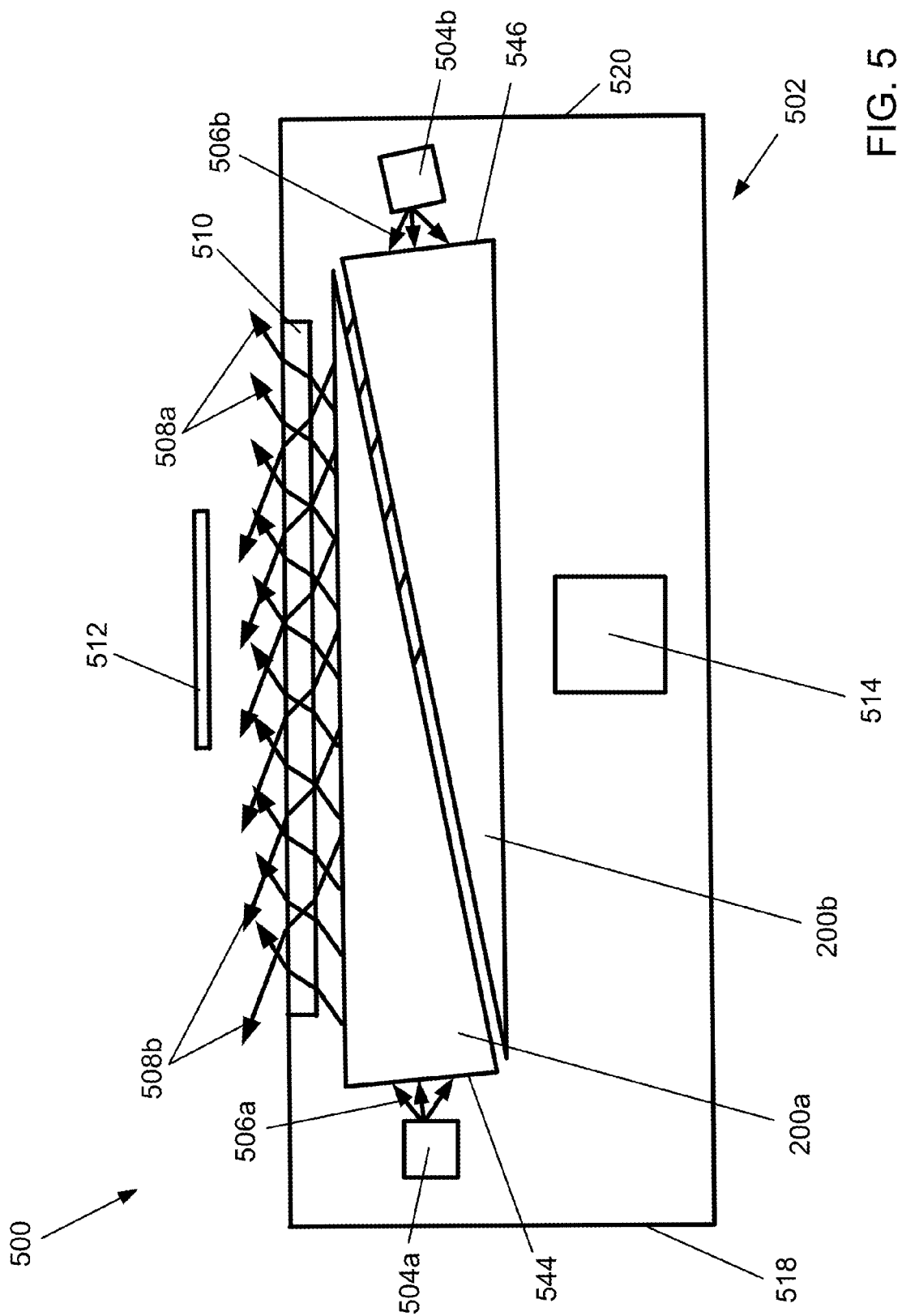
FIG. 5 is a diagram showing two of the wedge-shaped optical elements of FIG. 2 incorporated into a machine-readable symbol reader, according to at least one illustrated embodiment.

FIG. 5 illustrates a machine-readable symbol reader 500 that is similar to reader 300 and includes two of the optical elements 200, indicated by reference numerals 200a and 200b, and two illumination sources 504a, 504b similar to illumination source 304, that produce illumination beams 506a and 506b, respectively. Reader 500 also includes a housing 502 similar to housing 302, a window 510 similar to window 310, and a sensor array 514 similar to sensor array 314 except that the sensor array 514 is oriented at right angles, rather than obliquely, to the rectangular cross-sectional shape of the housing 502. The reader 500 can be used to image an object 512 and identify a machine-readable symbol formed thereon.

The base surface 544 of the optical element 200a and the illumination source 504a are positioned in close proximity to a first end 518 of the housing 502, while the base surface 546 of the optical element 200b and the illumination source 504b are positioned in close proximity to a second end 520 of the housing 502 opposite to the first end 518. Illumination beams 508a coupled out of the optical element 200a can exit out of the housing 502 through the window 510 at a positive grazing angle, that is, in a direction oriented toward the second end 520 of the housing 502. Illumination beams 508b coupled out of the optical element 200b, on the other hand, can exit out of the housing 502 through the window 510 at a negative grazing angle in a direction opposite that of the illumination beams 508a, that is, oriented toward the first end 518 of the housing 502. The optical elements 200a and 200b can be offset from one another along an axis extending into and out of the plane of FIG. 5, such that the illumination beams 508b do not pass or propagate through the optical element 200a. In an alternative implementation, the optical elements 200a and 200b can be located within the same plane along an axis extending into and out of the plane of FIG. 5, so that the illumination beams 508b do pass and/or propagate through the optical element 200a.

The reader 500 can provide twice or four times as much illumination as the reader 300, and can also provide high incidence angle illumination that approaches the object 512 and its machine-readable symbol from two different directions. In other implementations, more than two of the optical elements 200 can be used. For example, the optical element 200a can be considered to be rotationally offset from the optical element 200b by 180° about an axis extending perpendicularly to the window 510. One alternative implementation can include three optical elements 200, each offset from the other by 120° about such an axis. Another alternative implementation can include four optical elements 200, each offset from two of the others by 90°, and from the third of the others by 180°, about such an axis. Other alternative implementations can include five, six, eight, ten, twelve, or more optical elements 200 equally angularly spaced about such an axis.

Figure 6:
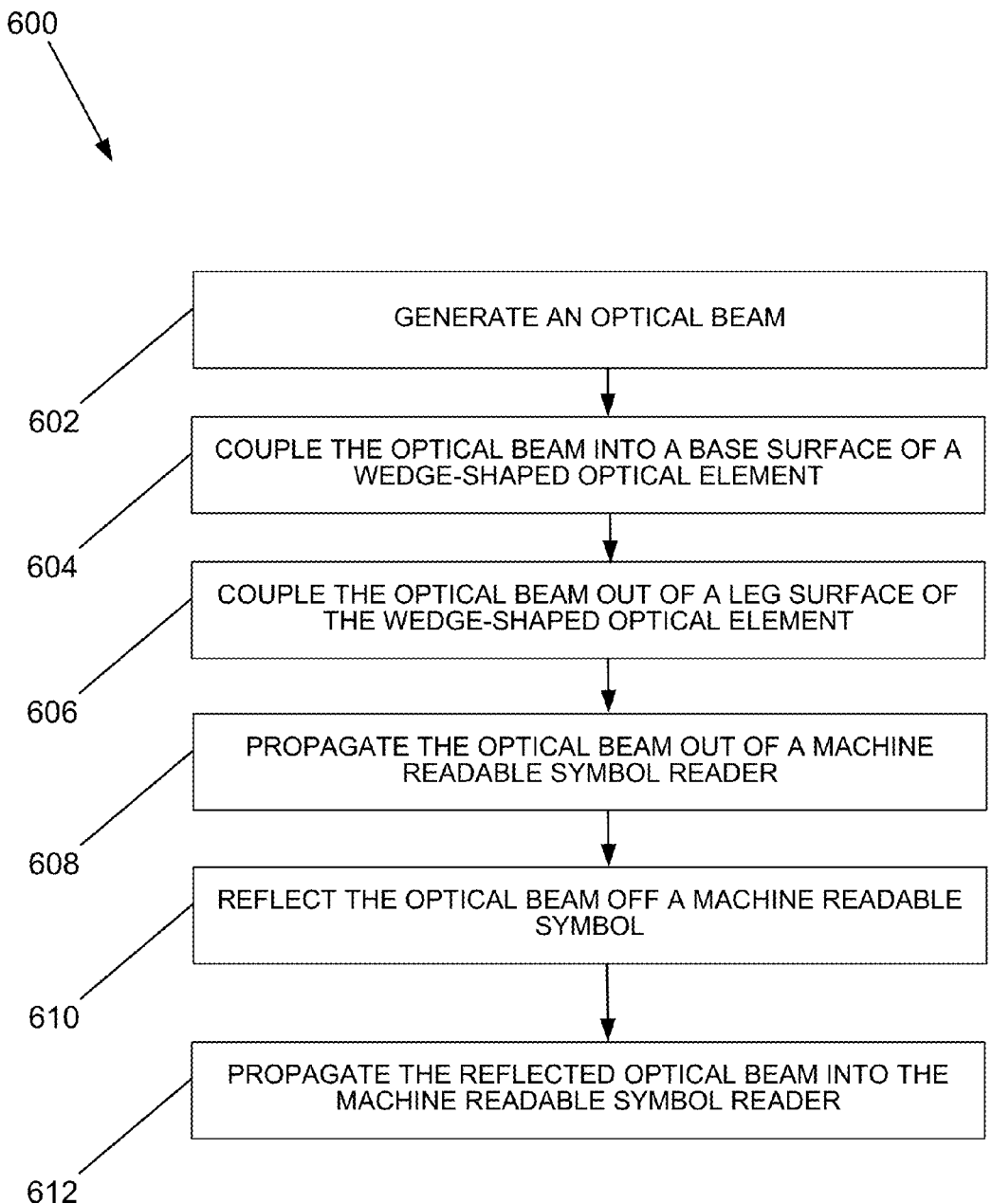
FIG. 6 is a flow diagram showing a method of imaging a machine-readable symbol, according to at least one illustrated embodiment.

FIG. 6 is a flow diagram showing a method 600 of imaging a machine-readable symbol, according to at least one illustrated embodiment. The method 600 can include generating at least one illumination beam at 602 and coupling the illumination beam into a base surface of a wedge-shaped optical element at 604. The method 600 can also include coupling the illumination beam out of the optical element through a leg surface thereof at 606, whereby the illumination beam exits out of a machine-readable symbol reader through a window thereof toward an object having the machine-readable symbol formed thereon at 608. The method 600 can further include receiving the illumination beam reflected or otherwise returned from the machine-readable symbol at 610 and passing the reflected or otherwise returned illumination beam into the machine-readable symbol reader through a window thereof toward a sensor array at 612.

Those of skill in the art will recognize that many of the methods or algorithms set out herein may employ additional acts, may omit some acts, and/or may execute acts in a different order than specified. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A machine-readable symbol reader comprising:
a first optical element having a first base, a first end, a first major face, a second major face, a first thickness, and a first length between the first base and the first end, the second major face non-parallel to the first major face and opposed across the first thickness of the first optical element from the first major face, the first thickness which varies along the first length of the first optical element, the first and the second major faces which propagate a diminishing amount of light passing through the first optical element along the first length thereof from the first base toward the first end by total internal reflection and which exit the light passing through the first optical element from the first base by refraction through at least one of the first or second major faces;
a first illumination source positioned to transmit illumination toward the first base of the first optical element;
a second optical element having a second base, a second end, a third major face, a fourth major face, a second thickness, and a second length between the second base and the second end, the fourth major face non-parallel to the third major face and opposed across the second thickness of the second optical element from the third major face, the second thickness which varies along the second length of the second optical element, the third and the fourth major faces which propagate a diminishing amount of light passing through the second optical element along the second length thereof from the second base toward the second end by total internal reflection and which exit the light passing through the second optical element from the second base by refraction through at least one of the third or fourth major faces;
a second illumination source positioned to transmit illumination toward the second base of the second optical element;
a housing that includes a window, the window positioned to pass illumination coupled out of the first major face of the first optical element, the window positioned to pass illumination coupled out of the third major face of the second optical element; and
an optical sensor array.

2. The machine-readable symbol reader of claim 1 wherein the machine-readable symbol reader is a barcode scanner.

3. The machine-readable symbol reader of claim 1 wherein an angle between the first major face and the second major face is between 0° and 10°.

4. The machine-readable symbol reader of claim 1 wherein the first optical element, the first illumination source, and the optical sensor array are positioned within the housing.

5. The machine-readable symbol reader of claim 1 wherein the optical sensor array is positioned to receive illumination entering the housing through the window.

6. The machine-readable symbol reader of claim 1, further comprising a mirror positioned adjacent to the second major face of the first optical element.

7. The machine-readable symbol reader of claim 1, further comprising a third illumination source positioned to transmit illumination toward the window without being coupled into the first base of the first optical element or the second base of the second optical element.

8. The machine-readable symbol reader of claim 1 wherein the housing includes a second window, the second window positioned to receive illumination that travels from a machine-readable symbol toward the optical sensor array.

9. The machine-readable symbol reader of claim 1 wherein the first optical element is rotationally offset from the second optical element by 180° about an axis perpendicular to the window.

10. A method of imaging a machine-readable symbol comprising:
generating illumination;
coupling a portion of the illumination into a first optical element having a first, base surface and a first decreasing thickness extending away from the first base surface through the first base surface of the first optical element;
coupling a portion of the illumination out of the first optical element through a first leg surface of the first optical element;
coupling a portion of the illumination into a second base surface of a second optical element;
coupling a portion of the illumination out of the second optical element through a second leg surface of the second optical element;
exiting a portion of the illumination out of a machine-readable symbol reader through a window of the machine-readable symbol reader toward the machine-readable symbol;
receiving a portion of the illumination returned from the machine-readable symbol; and
detecting at least a portion of the illumination returned from the machine-readable symbol by at least one sensor that is responsive to illumination.

11. The method of claim 10, further comprising decoding the machine-readable symbol based on the portion of the illumination detected by the at least one sensor.

12. The method of claim 10, further comprising returning a portion of the illumination that is coupled out of the first optical element through a third leg surface of the first optical element back towards the first optical element.

13. The method of claim 12 wherein the returning includes reflecting off a mirror positioned adjacent to the third leg surface of the first optical element.

* * * * *

UNITED STATES PATENT AND TRADEMARK OFFICE
CERTIFICATE OF CORRECTION

PATENT NO.         : 9,704,007 B2
APPLICATION NO.    : 14/856232
DATED              : July 11, 2017
INVENTOR(S)        : Alexander M. McQueen It is certified that error appears in the above-identified patent and that said Letters Patent is hereby corrected as shown below:

Column 16, Line 47 in Claim 10:
"element having a first, base surface and a first decreasing" should read --element having a first base surface and a first decreasing--.

Signed and Sealed this
Twentieth Day of February, 2018

Andrei Iancu
*Director of the United States Patent and Trademark Office*